United States Patent Office 3,109,875
Patented Nov. 5, 1963

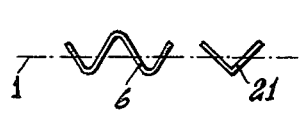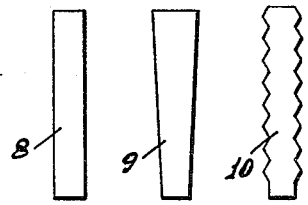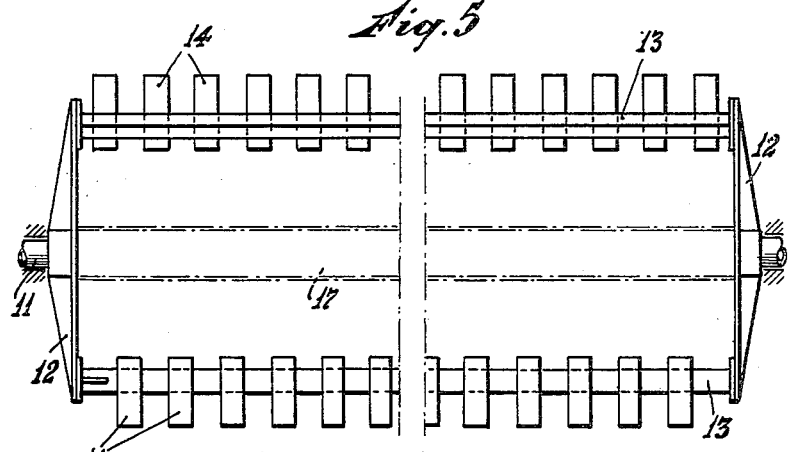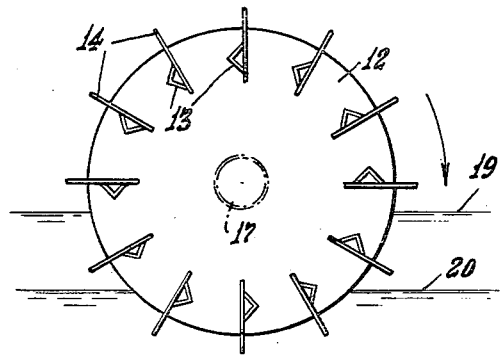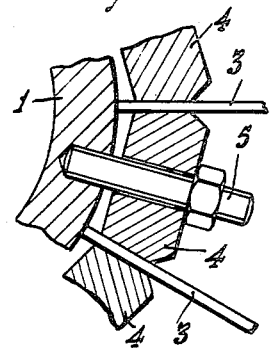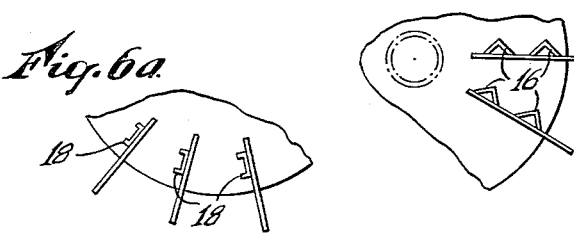

3,109,875
AERATION APPARATUS
Paul Schramm, Michelbach, and Leonhard Fechter, Kettenbach, Germany, Johan Kornelis Baars, The Hague, Netherlands, and Josef Muskat, Michelbach, Germany, assignors to Nederlandse Organisatie voor Toegepast-Natuurwetenschappelijk Onderzoek ten behoeve van de Volksgezondheid, The Hague, Netherlands
Filed June 21, 1961, Ser. No. 121,807
7 Claims. (Cl. 261—92)

This invention relates to a rotatable cylindrical rotor for introducing a gas or a mixture of gases into a liquid, and more in particular to an aeration rotor, of the type which is mounted on and rotating around a horizontal axis arranged above the liquid to be treated in such a way that less than half of the rotor is longitudinally immersed below the surface of said liquid.

Aeration rotors of the type indicated are known in particular for the aeration of sewage liquids. A generally known example is the "Kessener brush" which comprises a number of combs mounted on a rotatable shaft, each comb comprising a number of teeth tapering towards their top ends i.e. the ends away from the shaft, and being made of relatively resilient plate metal.

It is the object of this invention to provide an aeration rotor of improved gas-introducing capacity per unit of length of the rotor shaft and with an improved power efficiency in order to reduce the investments and operation costs considerably for a given required capacity.

Another object of this invention is to provide aeration rotors of a diameter range of about 40 to about 60 centimeters which dip into the sewage liquid between about 7 centimeters and one-fourth the rotor diameter whereby a high degree of aeration can be accomplished with a minimum of investment and power consumption.

Another object of the invention is to provide an aeration rotor which increases the amount of oxygen introduced into the sewage liquid, while reducing the power consumption, by introducing the oxygen along the angle of angled rotor blades, rotating in a direction so that they enter the sewage liquid with their open ends foremost.

Various other objects and advantages of our invention will become apparent as this description proceeds.

Surprisingly, we have found that the gas-introducing capacity and the power efficiency of a rotor of the type described are considerably improved if the rotor comprises a plurality of beating members which are mounted in a fixed position with regard to the rotatable shaft and which are of substantially rigid construction and of such a shape that the longitudinal length (width) of their top end which is directed from the said shaft is at least equal to the longitudinal length (width) of the end which is directed toward the said shaft.

Said beating members may be flat in the direction of a plane through the central axis of the rotor or they may be made of V-shaped angle iron or be curved so as to have a W-shaped cross-section with rounded angles. In case of flat beating members, their form may be either of substantially rectangular shape or the shape may be substantially as a trapezium, the greatest width being toward the end directed away from the shaft. The beating members need not be fixed directly to the shaft, but they may be mounted on strips of angle iron mounted between discmembers fixed to the axle of the rotor and parallel to the rotor axis.

As shown in Tables 4 and 5 hereof, for optimum oxygen introduction into the sewage liquid, at speeds below about 140 r.p.m., the V-shaped or W-shaped beating members should strike the liquid with their open ends (namely the top of the V or W shape) foremost. In this manner more oxygen seems to be introduced into the sewage liquid at lower speed and lower cost. Where a corrugated W form of beating member is used, as illustrated in Table 5, the large number of open corrugations should strike the liquid with their open ends foremost.

Various embodiments of the invention will be illustrated in the drawings in which FIG. 1 shows in part a top plan view of an embodiment of an aeration rotor;

FIG. 3 shows in cross-section a beating member of W-shaped profile and a beating member of V-shaped angle iron in a plane parallel to the central shaft;

FIG. 4 shows a front view of some different substantially flat beating members;

FIG. 5 shows a top plan view of another embodiment of the aeration rotor in which parts of the beating members have been omitted for the sake of clarity;

FIG. 6 shows a cross-section perpendicular to the central shaft of the rotor as shown in FIG. 5;

FIG. 6A illustrates a modification of the construction illustrated in FIGS. 5 and 6;

FIG. 6B illustrates a further modification of the construction illustrated in FIG. 5 and FIG. 6;

FIG. 7 shows an enlarged detail of FIG. 2.

Figure 1:
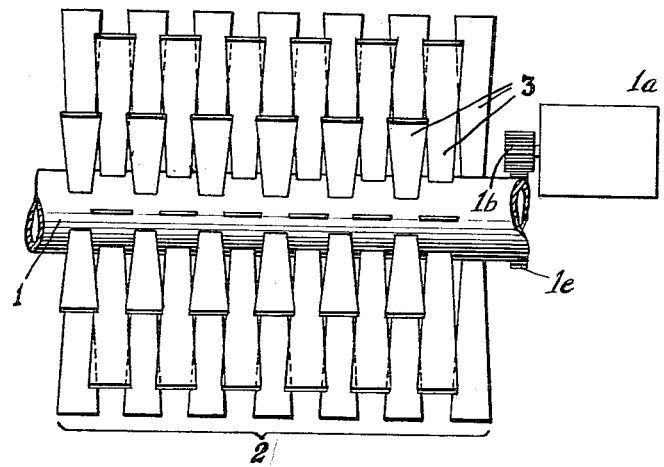

In FIG. 1 reference numeral 1 represents the rotatable shaft on which several rows 2 of beating members or teeth 3 have been mounted in a longitudinal direction (forming a "full-bladed" rotor). The teeth illustrated are trapezium-shaped. The rows 2 of teeth are placed in a staggered manner, seen in a direction perpendicular to the shaft.

Figure 2:
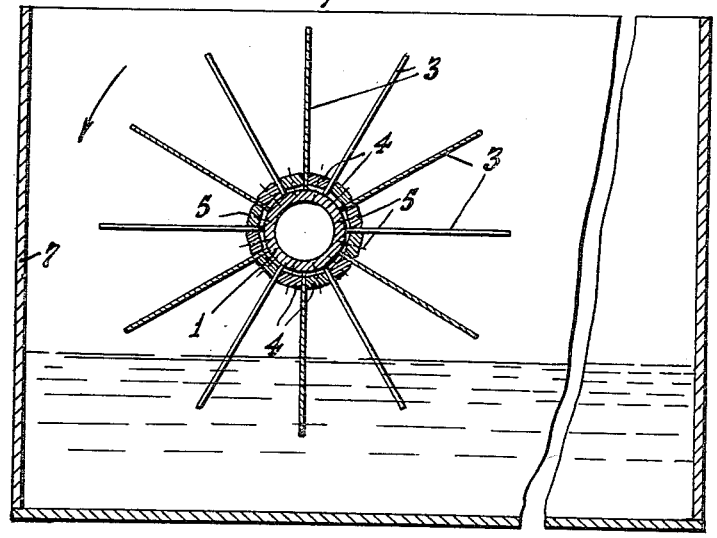
FIG. 2 shows a cross-section perpendicular to the central shaft of an aeration rotor.

The beating members 3 can be fastened on the shaft 1 by means of clamping strips 4. The cross-section of said strips is a trapezium with beveled edges as illustrated more clearly in FIG. 7, and said strips are fixed to the shaft by bolts 5 in a longitudinal direction. In a schematical way FIG. 2 shows also part of the walls of a conventional open tank or reservoir 7 for the liquid to be treated. The dimensions of said reservoir depend on the particular sewage treatment process used. Advantageously, the aeration rotors in question can be applied in aerating plants described in specification No. 2,684,941 and in various other known sewage treatment plants of the activated sludge type. A motor for driving the shaft is shown diagrammatically at 1a in FIG. 1. A conventional reduction gearing 1b and 1c is shown between the motor 1a and the shaft 1 of the aeration rotor.

FIG. 3 shows, in radial direction, a beating member 6 having a curved W-profile and a beating member 21 of V- shaped profile together with the central axis of the shaft 1 of the rotor. FIG. 4 shows various shapes of beating members 8, 9 and 10, seen in tangential direction.

In the cage type rotor of FIGS. 5 and 6 axle stumps 11 are fixed on two flanged disk or cheek-members 12, between which there are mounted supporting strips 13 of angle iron (or of another suitable material) on which beating members or teeth 14 are welded, which are not extending unto the central shaft. The teeth 14 may be mounted on a pair of strips of angle iron 16 (shown in FIG. 6B), extending between the cheek members 12.

A hollow shaft 17 may be present, as indicated with dotted lines, in FIG. 6, if required for sufficient strength of the structure, but it may also be omitted, in particular in rotors of short axial length.

The rotor is positioned in bearings with the axle shafts or trunnions 11 and is driven by any suitable instrument such as an electric motor (not shown in FIG. 5). If necessary a conventional reduction gear may be used.

The cross-section of said strips 13 and 16 of angle iron can have different forms. FIG. 6 shows V-shaped supporting strips 13 and, in FIG. 6A, U-shaped supporting strips 18 are shown.

In general the effect of the rotors and their power consumption is highly dependent upon the immersion depth of the the rotor in the liquid to the aerated, but this is not true to the same extent with the cage rotor of FIGS. 5 and 6.

The cage rotor is therefore preferably used in cases in which the height of the liquid surface varies, as indicated in FIG. 6 with two liquid levels 19 and 20. With increasing diameter of the rotor the number of combs can be greater.

It will be clear that the application of cylindrical shields or adjustable blinds around the side of the rotor rising out of the liquid may increase the oxygen dissolving capacity. However, the data shown in this specification were obtained in experiments in which no shields were present whatever.

The experiments reported in the tables below were made with a rotor of one meter length having a diameter of 50 cm.

The results of the measurements with a rotor with rectangular shaped teeth are summarized in Table 1 and Table 2, those with trapezium-shaped teeth in Table 3. The first three runs in Table 3 are at an immersion depth for the rotor of 13 cm. and the fourth run at an immersion depth of 18 cm. The tables show that the aeration rotors described herein have a very high oxygen-dissolving capacity per unit (meter) of length and a very high ratio between the amount of oxygen dissolved and the energy requirements for driving the rotors whereby the original installation costs and the power requirements for a rotor of a given oxygen dissolving capacity are reduced.

Table 1

Rotor with rectangular teeth; rotor diameter=50 cm.; immersion depth=3 cm. Tooth width and distance apart longitudinally of the shaft in cm.]

$n$=total number of teeth per metre of the rotor.
$E$=energy required in watts, net.
$OC$=rise in oxygen content in grams of $O_2$ per hour per metre of rotor, calculated for initial oxygen content of zero grams at 10° C. and 76 cm. Hg and measured in samples taken before and after 24 seconds of aeration (unless otherwise stated).

| Tooth width | Distance apart | r.p.m. | E | r.p.m. | OC | OC/kwh. |
|---|---|---|---|---|---|---|
| 3 | 1.5 cm., $n=264$ | 85 | 602.1 | 86 | 2,081.6 | 3,396 |
|   |   | 97.5 | 749.6 | 94 | 2,326 | 3,290 |
|   |   | 117 | 1,173.4 | 117.5 | 3,061.4 | 2,603 |
|   |   | 132 | 1,364.2 | 130 | 3,380.7 | 2,532 |
| 3 | 3 cm., $n=204$ | 85 | 513.2 | 85 | 1,848.3 | 3,602 |
|   |   | 97.5 | 698 |   |   |   |
|   |   | 117 | 1,077.9 | 117 | 3,321.9 | 3,082 |
|   |   | 130 | 1,345.9 | 131 | 4,156.2 | 3,049 |
| 3 | 4.5 cm., $n=162$ | 85 | 478 | 87.5 | 1,616.9 | 3,215 |
|   |   | 99 | 630.8 |   |   |   |
|   |   | 119 | 992.7 | 120 | 3,745.9 | 3,705 |
|   |   | 132.5 | 1,245.3 | 133 | 3,972.4 | 3,165 |

Table I—Continued

| Tooth width | Distance apart | r.p.m. | E | r.p.m. | OC | OC/kwh. |
|---|---|---|---|---|---|---|
| 5 | 3 cm., $n=150$ | 85 | 619.7 | 82.5 | 2,068.3 | 3,506 |
|   |   | 97 | 769.9 | 97 | 2,882.8 | 3,744 |
|   |   | 115 | 1,205.4 |   |   |   |
|   |   | 129 | 1,387.6 | 125 | 3,920.6 | 2,937 |
| 5 | 5 cm., $n=120$ | 85 | 576.7 | 86 | 1,952 | 3,292 |
|   |   | 97.5 | 816.6 | 95 | 2,831.4 | 3,711 |
|   |   | 116.5 | 1,163.4 | 116 | 3,982.5 | 3,469 |
| 5 | 7.5 cm., $n=96$ | 85.5 | 621.4 | 85 | 1,715.7 | 2,836 |
|   |   | 98.5 | 737.4 | 97.5 | 2,489.7 | 3,233 |
|   |   | 118 | 1,118.5 | 118 | 3,047.3 | 2,726 |
|   |   | 132 | 1,252.9 | 134 | 3,705 | 2,917 |
| 7 | 3 cm., $n=120$ | 85 | 713.6 | 85 | 1,927 | 2,699 |
|   |   | 97.5 | 882.2 | 99 | 2,463.6 | 2,737 |
|   |   | 118 | 1,136.3 | 117.5 | 3,011 | 2,653 |
| 7 | 4.2 cm., $n=108$ | 86 | 605.9 | 85 | 1,923 | 2,807 |
|   |   | 98 | 846.5 | 96 | 2,286.3 | 2,788 |
|   |   | 118.5 | 1,119.9 | 118 | 2,893.5 | 2,607 |
| 7 | 7 cm., $n=84$ | 85 | 616.8 | 85 | 1,776.8 | 2,880 |
|   |   | 98 | 781.1 | 97.5 | 2,884.2 | 2,947 |
|   |   | 118 | 1,035.3 | 117.5 | 2,703.9 | 2,628 |
| 10 | 3.3 cm., $n=90$ | 72 | 548.6 |   |   |   |
|   |   | 85 | 717.2 | 85 | 1,991.9 | 2,778 |
|   |   | 99 | 874.6 | 95 | 2,457.1 | 2,971 |
|   |   | 117.5 | 1,127.2 | 117 | 2,955.5 | 2,636 |

Table 2

[Rotor with rectangular teeth; rotor diameter 50 cm.; tooth width=4.5 cm.; tooth distance apart=4.5 cm.; $n=132$]

| Immersion depth | r.p.m. | E | r.p.m. | OC | OC/kwh. |
|---|---|---|---|---|---|
| 3 cm | 127.5 | 246.6 | 128.3 | 667.6 | 2,681 |
|   | 148.5 | 317.2 | 148.3 | 744.4 | 2,348 |
| 8 cm | 101 | 515.8 | 102 | 1,682 | 3,222 |
|   | 123 | 687 | 124 | 1,871.5 | 2,712 |
|   | 142 | 803.3 | 144 | 2,066 | 2,535 |
| 13 cm | 85 | 556.2 | 86 | 1,764 | 3,068 |
|   | 97 | 777.7 | 99 | 2,542.9 | 3,147 |
|   | 117 | 1,135.2 | 117.5 | 3,565 | 3,127 |
|   | 132.5 | 1,366.9 | 135 | 4,096.9 | 2,926 |
| 18 cm | 84 | 768 | 84.5 | 2,258 | 2,895 |
|   | 93.5 | 959.8 | 96 | 3,168.6 | 3,091 |
|   | 111 | 1,444.2 | 112 | 3,953.1 | 2,693 |

Table 3

Rotor with trapezium-shaped teeth, rotor diameter=50 cm.; immersion depth of rotor=$d$, top width of teeth= 5 cm., width of teeth at the base =3 cm., diameter of shaft=7 cm.]

| Tooth distance apart at the top | r.p.m. | E | r.p.m. | OC | OC/kwh. |
|---|---|---|---|---|---|
| 0.6 cm., $n=216, d=13$ cm | 48.5 | 219.4 | 45 | 410.6 | 2,346 |
|   | 73 | 533.9 |   |   |   |
|   | 85 | 705.8 | 87.5 | 2,464.3 | 3,362 |
|   | 97 | 843.7 |   |   |   |
|   | 117 | 1,161.8 | 121 | 3,471 | 2,857 |
|   | 129 | 1,323.9 |   |   |   |
|   | 141 | 1,493 | 146 | 3,904 | 2,503 |
| 1.3 cm., $n=186, d=13$ cm | 74 | 488.8 |   |   |   |
|   | 85 | 665.7 | 84.5 | 2,325.7 | 3,545 |
|   | 98 | 825.5 | 97 | 2,872 | 3,528 |
|   | 117 | 1,135.4 | 117 | 3,652 | 3,216 |
|   | 132 | 1,354.7 | 132 | 3,995.9 | 2,950 |
| 3 cm., $n=150, d=13$ cm | 53.5 | 185.6 | 45 | 366.6 | 3,666 |
|   | 74 | 426.6 | 71 | 1,301 | 3,319 |
|   | 86 | 616.1 | 83 | 1,983.9 | 3,499 |
|   | 98 | 749.3 | 97.5 | 2,745.9 | 3,708 |
|   | 116 | 1,058.1 | 116 | 3,737 | 3,532 |
|   | 13,.5 | 1,286.6 |   |   |   |
|   | 142 | 1,432.7 | 144 | 3,998.4 | 2,748 |
| 7.5 cm., $n=96$ | 97 | 753 | 97 | 1,927.8 | 2,560 |
|   | 49 | 202.7 | 45.4 | 344.9 | 2,299 |
|   | 73 | 580.6 | 74 | 1,801.6 | 2,993 |
| 3 cm., $n=150, d=18$ cm | 83.5 | 812.6 | 82.5 | 2,683.3 | 3,350 |
|   | 94 | 1,045.7 | 92.5 | 3,441.2 | 3,441 |
|   | 110 | 1,480 |   |   |   |
|   | 119 | 1,662.5 | 119 | 4,679.4 | 2,815 |

Table 4 shows some results with V-shaped teeth, Table 5 with W-shaped teeth and, for purposes of comparison, Table 6 gives the values measured with a "classical" Kessener brush of the same diameter.

Table 4

[Diameter of rotor=50 cm.; V-shaped teeth, longitudinal width of teeth=0.2 cm.=distance between two teeth. Direction of rotation as indicated]

| | V ↓ V ↓ | | | | VV ↓ V ↓ | | |
|---|---|---|---|---|---|---|---|
| r.p.m. | OC | E | OC/kwh. | r.p.m. | OC | E | OC/kwh. |
| 100 | 1,602.9 | 572.7 | 2,799 | 100.5 | 1,802 | 599.5 | 3,006 |
| 110 | 1,967 | 711 | 2,764 | 110 | 2,182 | 746 | 2,925 |
| 120 | 2,335 | 852 | 2,738 | 120 | 2,585 | 901 | 2,869 |
| 130 | 2,705 | 977 | 2,768 | 130 | 2,987 | 1,035 | 2,886 |
| 139.5 | 3,065 | 1,110 | 2,762 | 137.5 | 3,288.2 | 1,133.7 | 2,900 |
| 150 | 3,358 | 1,285 | 2,670 | 140 | 3,337 | 1,157 | 2,884 |
| 160 | 3,641 | 1,445 | 2,520 | 150 | 3,542 | 1,301 | 2,723 |
| 170 | 3,932 | 1,613 | 2,438 | 160 | 3,745 | 1,495 | 2,502 |
| 173.8 | 4,040 | 1,665 | 2,426 | 171 | 3,975 | 1,719.6 | 2,311 |

| | Λ ↓ Λ ↓ | | | | ΛΛ ↓ Λ ↓ | | |
|---|---|---|---|---|---|---|---|
| r.p.m. | OC | E | OC/kwh. | r.p.m. | OC | E | OC/kwh. |
| 100 | 2,013.2 | 640 | 3,146 | 99.5 | 2,088.4 | 635 | 3,289 |
| 110 | 2,365 | 818 | 2,891 | 110 | 2,508 | 816 | 3,071 |
| 120 | 2,718 | 996 | 2,729 | 120 | 2,916 | 987 | 2,954 |
| 130 | 3,018 | 1,158 | 2,606 | 130 | 3,329 | 1,148 | 2,900 |
| 140 | 3,314 | 1,279 | 2,591 | 132.5 | 3,432 | 1,190 | 2,884 |
| 147 | 3,527.1 | 1,348 | 2,617 | 140 | 3,482 | 1,328 | 2,622 |
| | | | | 150 | 3,548 | 1,555 | 2,282 |
| | | | | 153.8 | 3,579 | 1,650 | 2,169 |

Table 5

[Diameter of rotor=50 cm.; W-shaped teeth, longitudinal width of teeth=4.5 cm., mutual distance apart=3.5 cm. Direction of rotation as indicated]

| | WW ↓ W (corrugated) ↓ | | | | ΜΜ ↓ Μ (corrugated) ↓ | | |
|---|---|---|---|---|---|---|---|
| r.p.m. | OC | E | OC/kwh. | r.p.m. | OC | E | OC/kwh. |
| 99 | 2,004.8 | 635 | 3,157 | 100 | 2,309.6 | 688 | 3,357 |
| 110 | 2,392 | 809 | 2,957 | 110 | 2,659 | 848 | 3,136 |
| 120 | 2,751.1 | 975 | 2,822 | 119 | 2,679 | 892 | 3,003 |
| 130 | 2,982 | 1,075 | 2,774 | 130 | 3,105 | 1,143 | 2,716 |
| 140 | 3,213 | 1,178 | 2,728 | 140 | 3,223 | 1,273 | 2,532 |
| 151 | 3,468.5 | 1,302 | 2,664 | 149 | 3,333.3 | 1,380 | 2,415 |

Table 6

[Classical rotor of the "Kessener brush" type with teeth of resilient sheet material tapering toward their top ends, width at bottom 1.1 cm., width near rounded top=0.4 cm., area of space between two adjoining teeth equals area of teeth, diameter of rotor=50 cm., immersion depth=13 cm. OC measured before and after 32 seconds of aeration]

| r.p.m. | OC | E | OC/kwh. |
|---|---|---|---|
| 100 | 1,338 | 482 | 2,776 |
| 110 | 1,680 | 617 | 2,723 |
| 120 | 2,035 | 735 | 2,769 |
| 130 | 2,415 | 877 | 2,754 |
| 136 | 2,645 | 964 | 2,744 |

The measurements of the energy were carried out with a dynamometer with a torsion-balance and were taken as the average value of a number of readings with increasing rotation speed and with decreasing rotation speed. The oxygen content of the liquid was measured before and after an aeration time of 24 seconds in Tables 1 to 5 and of 32 seconds in Table 6. All the above data were derived from a rotor having a diameter of 50 cm., between the outermost ends of two teeth mounted on opposite sides of the central axis. Experiments made with a rotor with a diameter of 42 cm. showed corresponding results.

With rotors having beating members mounted directly on the axis, diameters of between about 40 and about 60 centimeters, preferably between about 45 and 55 centimeters, with immersion depths of about 7 centimeters to one-fourth the diameter of the rotor show the best results. At diameters of less than about 40 centimeters the air dissolving capacity is too low and above 60 centimeters diameter the construction has to be made so heavy, to withstand the forces encountered, that the original cost as well as the operating costs are increased beyond the limits of economy.

The curved (W-profiled) teeth showed a definitely better result than the V-shaped teeth and the latter showed a better result than the classical or Kessener rotor. For best result rotors with V-shaped or W-shaped teeth should be mounted and rotated so that the V-shaped or W-shaped beating members strike the sewage liquid with their open ends foremost. The flat rectangular and trapezium-shaped teeth showed a yet much better result than the W-shaped teeth, in particular at a certain speed range.

The tables show that a combination of relatively narrow teeth with larger intermediate spaces gives better results at a higher rotation speed (about 100 r.p.m. and higher); rotors having wide teeth with narrow intermediate spaces, however, give maximum results at lower r.p.m. values (of about 100 r.p.m. and less), in order to keep the oxygen supply capacity optimal and economical. Therefore, in general, if one wishes to operate at relatively low rotation speeds, a rotor should be used in which the ratio of the distance between the teeth to the width of the teeth is less than one.

The maximum in OC/kwh. values versus rotation speeds shows what the rotors can perform; these maxima are of two different natures; those with respect to the width and distance of the teeth apart and those with respect to the immersion depth are to be distinguished.

As to the distance between two adjoining beating members, care should be taken that the liquid to be treated can easily pass between two teeth. In general it can be said that the best results are obtained as regards the power consumption of the aeration process, if the area of the intermediate spaces between two adjoining beating members is almost equal to the area of each beating member (all this being measured in a plane through the axis of the rotor).

Preferably the ratio between the width of the beating members at the top and the width near the shaft lies between the values 1:1 and 5:3.

We believe that the facts disclosed in this specification can be explained in part by assuming that the amount of air which is dissolved in the liquid by the beaters is increased if the liquid is brought into turbulence as much as possible in the space between two beating members. The smaller the area between the teeth, the lower the required rotation speed at which turbulence will be reached in the space between two beating members. If the area between the teeth is the same as the area of the teeth, the water displaced by the moving teeth can easily pass between the teeth, but this passing should not be promoted by rounded edges as experiments with round bars and semi-round bars have shown. With such rounded edges the occurrence of turbulence between the teeth is not promoted.

As shown by the foregoing data, the favorable effect of the rotor can be increased by fixing the tooth-shaped beating members in succession in combs and mounting these combs in such a way that, viewed in the direction of rotation, the teeth are placed in a staggered manner.

The aerating rotors are, in general, mounted above an open tank or open reservoir with their shaft parallel to the surface of liquid in the tank or reservoir in such a way that about one fourth to one sixth of the diameter of the rotor is vertically immersed in the liquid when said rotor is approximately 50 cm. in diameter and are driven by any known driving means such as an electric motor.

For greatest efficiency rotors having beating members mounted directly on the axis (full-bladed rotors), should have a diameter of between about 40 and about 60 centimeters and preferably between 45 and 55 centimeters, and should be immersed in the liquid between about 7 centimeters and one-fourth of the rotor diameter. At diameters of less than 40 centimeters, the air dissolving capacity of the rotor diminishes too much and at diameters of larger than about 60 centimeters, the construction of the full-bladed rotor has to be made too heavy (requiring greater power consumption) in order to withstand the forces arising from its rotation through the liquid at the required rotation speed range (between about 60 and about 200 r.p.m.).

Cage rotors, such as illustrated in FIGS. 5, 6 and 7, can withstand stronger forces and can be made of larger diameters ranging from about 60 to about 80 centimeters without becoming of too heavy construction. Since the teeth of such cage rotors have a relatively high peripheral speed and therefore, tend to disturb the bacterial flocculates, the cage rotors should be used in the lower r.p.m. region of between about 60 and about 90 r.p.m. Nevertheless they show an oxygen uptake and a power consumption per meter of length in the same region as the full-bladed rotors.

The cage rotors are designed in particular for installations in which the height of the liquid level undergoes a substantial variation as illustrated at 19 and 20 in FIG. 6. They can be immersed into the liquid to a further extent than the full-bladed rotors, without the power consumption becoming too high. Therefore, our cage rotors allow being mounted in such a manner that the immersion depth may vary between about 7 centimeters and four-tenths of the diameter of the rotor.

In general the rotors may be used for aeration purposes in particular for the purification of sewage, but they can also be used for other purposes such as the aeration of ground water or of an inoculated culture medium for the production of vitamins or antibiotics, and for removing a particular gas from a liquid by aerating the liquid with air, e.g. for removing an excess of corrosive carbon dioxide in water.

This application is a continuation-in-part of our copending application Serial No. 651,064, filed April 5, 1957, now abandoned.

We claim:

1. An aeration apparatus for the treatment of sewage, comprising an open tank containing sewage liquid and a cylindrical rotor mounted on a horizontal axis parallel to the surface of the liquid above the liquid in the tank, beating members arranged in approximately diametrically opposite rows on said rotor dipping into said sewage liquid about one-fourth to one-sixth of the diameter of said rotor measured from the outer end of one beating member to the outer end of a diametrically opposite beating member wherein said rotor is approximately 50 cm. in diameter, means to rotate said rotor about its axis, said rotor comprising a plurality of beating members mounted in a plurality of rows in a fixed position with regard to the axis of said rotor, said beating members being equally spaced with reference to each other in each row and of a substantially rigid construction, said beating members being of the longitudinal length on the top end of said beating members which is directed from the axis of said rotor at least equal to the longitudinal length of the end of said beating members which is directed toward the axis of said rotor.

2. An aeration apparatus for the treatment of sewage, comprising an open tank containing sewage liquid and a cylindrical rotor mounted on a horizontal axis parallel to the surface of the liquid above the liquid in the tank, beating members arranged in approximately diametrically opposite rows on said rotor dipping into said sewage liquid about one-fourth to one-sixth of the diameter of said rotor measured from the outer end of one beating member to the outer end of a diametrically opposite beating member, means to rotate said rotor about its axis, said rotor comprising a plurality of beating members mounted in a plurality of rows in a fixed position with regard to the axis of said rotor, said beating members being equally spaced with reference to each other in each row and of a substantially rigid construction, said beating members being of the longitudinal length on the top end of said beating members which is directed from the axis of said rotor at least equal to the longitudinal length of the end of said beating members which is directed toward the axis of said rotor, said rotor comprising disc members fixed to the axle of said rotor and strips mounted in a longitudinal direction between said disc members, said strips being spaced circumferentially around said axis, said strips having the beating members attached thereto, said beating members comprising rows of flat teeth which extend from said strips in a radial direction, said teeth being spaced from the axis of said rotor and being spaced apart by a distance at least equal to the width of each tooth.

3. An aeration apparatus for the treatment of sewage, comprising an open tank containing sewage liquid and a cylindrical rotor mounted on a horizontal axis parallel to the surface of the liquid above the liquid in the tank, beating members arranged in approximately diametrically opposite rows on said rotor dipping into said sewage liquid between about 7 cm. to about one-fourth of the diameter of said rotor, measured from the outer end of one beating member to the outer end of a diametrically opposite beating member, wherein said rotor has a diameter of between approximately 40 and 60 centimeters, means to rotate said rotor about its axis, said rotor comprising a plurality of beating members mounted in a plurality of rows in a fixed position with regard to the axis of said rotor, said beating members being equally spaced with reference to each other in each row and of a substantially rigid construction, said beating members being of the longitudinal length on the top end of said beating members which is directed from the axis of said rotor at least equal to the longitudinal length of the end of said beating members which is directed toward the axis of said rotor.

4. Aeration rotor as claimed in claim 3, wherein the beating members are angle steel rotor blades rotating in a direction so that they strike the liquid with their open end foremost.

5. An aeration apparatus for the treatment of sewage, comprising an open tank containing sewage liquid and a cylindrical rotor mounted on a horizontal axis parallel to the surface of the liquid above the liquid in the tank; means to rotate said rotor about its axis, said rotor comprising disc members fixed to the axle of said rotor and strips mounted in a longitudinal direction between said disc members, said strips being spaced circumferentially around said axis, said strips having substantially rigid beating members arranged in approximately diametrically opposite rows attached thereto, said beating members comprising rows of flat teeth which are mounted on said strips in a radial direction, said teeth being spaced apart from the axis of said rotor, and said teeth mounted on the same strip being spaced apart by a distance at least equal to the width of each tooth, said rotor dipping into said sewage liquid between about 7 centimeters and four-tenths of the diameter of said rotor, measured from the outer end of one beating member to the outer end of a diametrically opposite beating member, wherein said rotor has a diameter of between approximately 40 and 80 centimeters.

6. An aeration rotor as claimed in claim 5, wherein the beating members mounted to adjoining strips are positioned in a staggered manner.

7. An aeration rotor as claimed in claim 5, wherein the strips are made of angle iron and the beating members are flat rectangular teeth.

References Cited in the file of this patent

UNITED STATES PATENTS

| 71,182 | Kilgore | Nov. 19, 1867 |
| 208,783 | Baird | Oct. 8, 1878 |
| 241,889 | Smyth | May 24, 1881 |
| 963,122 | Damon | July 5, 1910 |
| 1,113,123 | Innes | Oct. 6, 1914 |
| 1,926,083 | Christensen | Sept. 12, 1933 |
| 2,798,042 | Cox | July 2, 1957 |

FOREIGN PATENTS

| 3,267 of 1880 | Great Britain | Aug. 10, 1880 |
| 547,718 | Belgium | May 31, 1956 |